(12) United States Patent
Vaassen et al.

(10) Patent No.: US 6,621,245 B2
(45) Date of Patent: Sep. 16, 2003

(54) SYSTEM FOR THE STABILIZATION OF AN OBJECT MOUNTED ON A MOVING PLATFORM

(75) Inventors: Wilhelmus Marie Hermanus Vaassen, Hengelo (NL); Antonius C. J. Stavenuiter, Boekelo (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 10/066,758

(22) Filed: Feb. 6, 2002

(65) Prior Publication Data

US 2002/0105298 A1 Aug. 8, 2002

Related U.S. Application Data

(63) Continuation of application No. 09/462,076, filed as application No. PCT/EP98/04955 on Jul. 8, 1998, now Pat. No. 6,351,092.

(30) Foreign Application Priority Data

Jul. 16, 1997 (NL) .............................................. 1006599

(51) Int. Cl.[7] .......................... B64C 17/02; B64C 17/06
(52) U.S. Cl. ......................... 318/648; 318/649; 33/318; 33/321; 33/344; 74/5.37; 74/5.7; 244/79; 244/177; 248/184.1; 248/178.1; 248/180.1
(58) Field of Search ................................. 318/648, 649, 318/591, 609, 610, 584, 585, 586; 33/318, 321, 344; 74/5.34, 5.37, 5.7; 244/79, 177; 248/184.1, 178.1, 180.1; 343/765, 766; 701/220

(56) References Cited

U.S. PATENT DOCUMENTS

| | | | | |
|---|---|---|---|---|
| 3,986,092 A | * | 10/1976 | Tijsma et al. ................ | 318/649 |
| 4,035,805 A | * | 7/1977 | Mobley ....................... | 318/649 |
| 4,052,654 A | * | 10/1977 | Kramer et al. ............... | 244/165 |
| 4,334,226 A | * | 6/1982 | Eguchi et al. ............... | 342/355 |
| 4,418,306 A | * | 11/1983 | Samsel ....................... | 244/171 |
| 4,680,521 A | * | 7/1987 | Hofman ...................... | 318/588 |
| 5,075,861 A | * | 12/1991 | Hasson et al. .............. | 318/648 |
| 5,124,938 A | * | 6/1992 | Algrain ....................... | 248/550 |
| 5,922,039 A | * | 7/1999 | Welch et al. ............. | 280/5.507 |

* cited by examiner

Primary Examiner—Robert E. Nappi
Assistant Examiner—Edgardo San Martin
(74) Attorney, Agent, or Firm—Oblon, Spivak, McClelland, Maier & Neustadt, P.C.

(57) ABSTRACT

A calculation system for calculating the control signals which are designed to perform a frequency-dependent weighting of the angular velocity signals and the angular position signals. The angular velocity indicators are preferably used for stabilization in a high frequency band while the angular position indicators are suitable for stabilization in a low frequency band. A further calculation system which is designed to perform the frequency-dependent weighting such that the control signals for frequencies below a certain frequency are substantially determined by the angular position signals and the control signals for higher frequencies are substantially determined by the angular velocity signals.

10 Claims, 4 Drawing Sheets

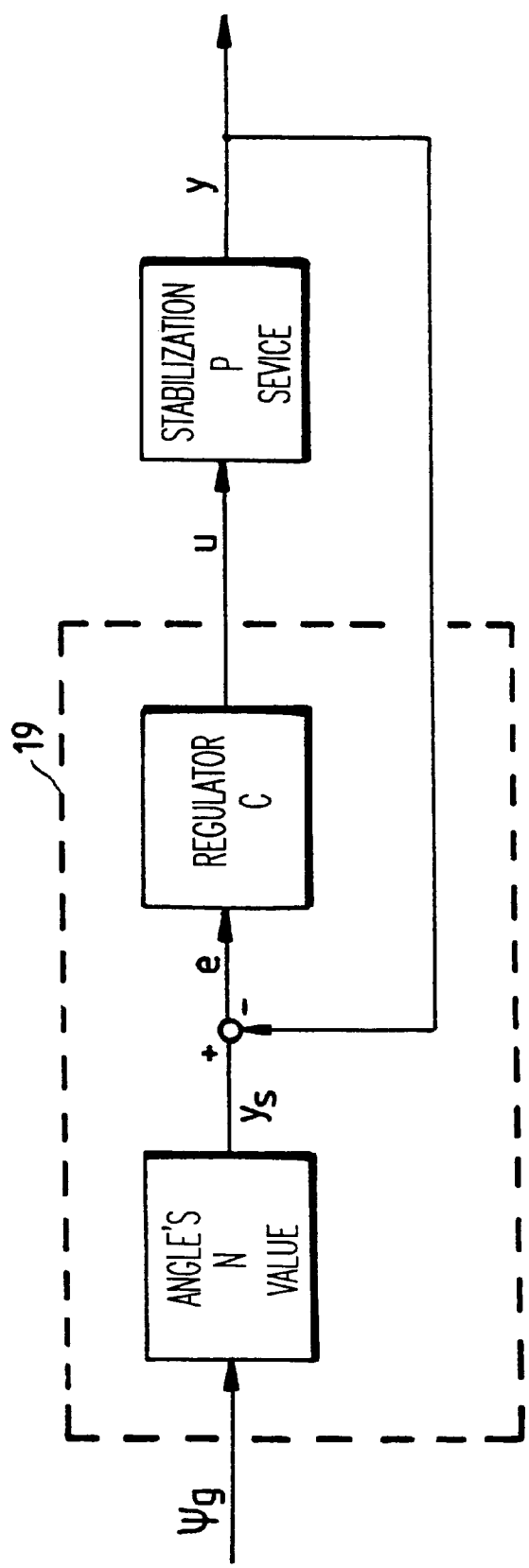
FIG. 2 *PRIOR ART*

SYSTEM FOR THE STABILIZATION OF AN OBJECT MOUNTED ON A MOVING PLATFORM

BACKGROUND OF THE INVENTION

1. Field of the Invention

The invention relates to a system for the stabilization of an object with reference to a moving platform, including a stabilization device provided with servo motors and a servo control unit. A platform is connected to a side of the stabilization device to be stabilized.

2. Discussion of the Background

The invention is in particular suitable for the stabilization of sensors on a naval ship. A system of this type is known inter alia from patent specification U.S. Pat. No. 5,573,218, which is hereby incorporated by reference. The stabilization device described in the present patent specification comprises a stack of wedge-shaped elements, whereby each element is rotatable with reference to the underlying element. The orientation of the object is thus realized by the relative rotation of sub-elements which are mutually rotatable about non-parallel shafts. The servo control unit ensures that the object, through rotation of the individual elements, assumes and maintains a desired, usually horizontal, position. In the embodiment described in this patent specification, the position of the object with reference to a substructure is calculated on the basis of the geometry of the stabilization device and the relative angular position of each element with reference to its underlying element. These relative angular positions are determined with the aid of encoders. A drawback of the stabilization device is that vibrations may cause stabilization errors owing to a certain measure of elasticity inherent in the stabilization system. This may have adverse consequences, particularly if the stabilization device is to be used for stabilizing an optical scanner, which requires a high degree of stabilization accuracy.

A possible solution to this problem may be obtained from patent specification U.S. Pat. No. 3,358,285. The stabilization platform described therein is provided with gyroscopes in order to determine its position with respect to an inertial coordinate system. However, this solution has the drawback that angle-indicating gyroscopes are relatively costly, certainly if a high degree of accuracy is required. Besides, no benefit can then be derived from the fact that naval ships are usually equipped with a central gyro system, used for determining the ship's angular positions with respect to an inertial coordinate system.

The system according to the invention has for its object to provide a solution to these problems and is characterized in that:

- the system further includes an angular velocity measuring device with respect to an inertial coordinate system, which device is connected to the stabilization platform;
- the servo control unit is provided with means to connect the servo control unit to an external angular position measuring unit of the moving platform;
- the servo control unit is designed to control the servo motors on the basis of angular position signals from the angular position measuring unit and angular velocity signals from the angular velocity measuring device.

A naval ship usually includes a system of centrally situated gyroscopic angular position encoders used for measuring the ship's angles with respect to a north horizontal coordinate system. Sensors that require stability, are positioned at a certain distance to the angular position encoders. Ship deformations and vibrations may cause the measured angular position and the actual angular position at the sensor to deviate. A solution to this problem is obtained by combining the angular velocity signals with the angular position measurements.

SUMMARY OF THE INVENTION

This yields two different measuring instruments to realize the stabilization, each having its own specific advantages and drawbacks. Actual practice will show that one of the two instruments performs a more accurate measurement in a certain frequency range than in another frequency range.

A favorable embodiment is thereto characterized in that the calculation means for calculating the control signals are designed to perform a frequency-dependent weighting of the angular velocity signals and the angular position signals.

The angular velocity indicators are preferably used for stabilization in a high frequency band while the angular position indicators are suitable for stabilization in a low frequency band. Thus, ship vibrations are not transmitted to the stabilization platform, whereas high-frequency disturbances (abrupt motions) are suppressed to a sufficient extent.

A further favorable embodiment is thereto characterized in that the calculation means are designed to perform the frequency-dependent weighting such that the control signals for frequencies below a certain frequency $\omega_0$ are substantially determined by the angular position signals and the control signals for higher frequencies are substantially determined by the angular velocity signals.

BRIEF DESCRIPTION OF THE PREFERRED EMBODIMENTS

The invention will now be described in greater detail with reference to the following figures, in which:

FIG. 2 represents an embodiment of a conventional servo control unit;

Figure 1A:
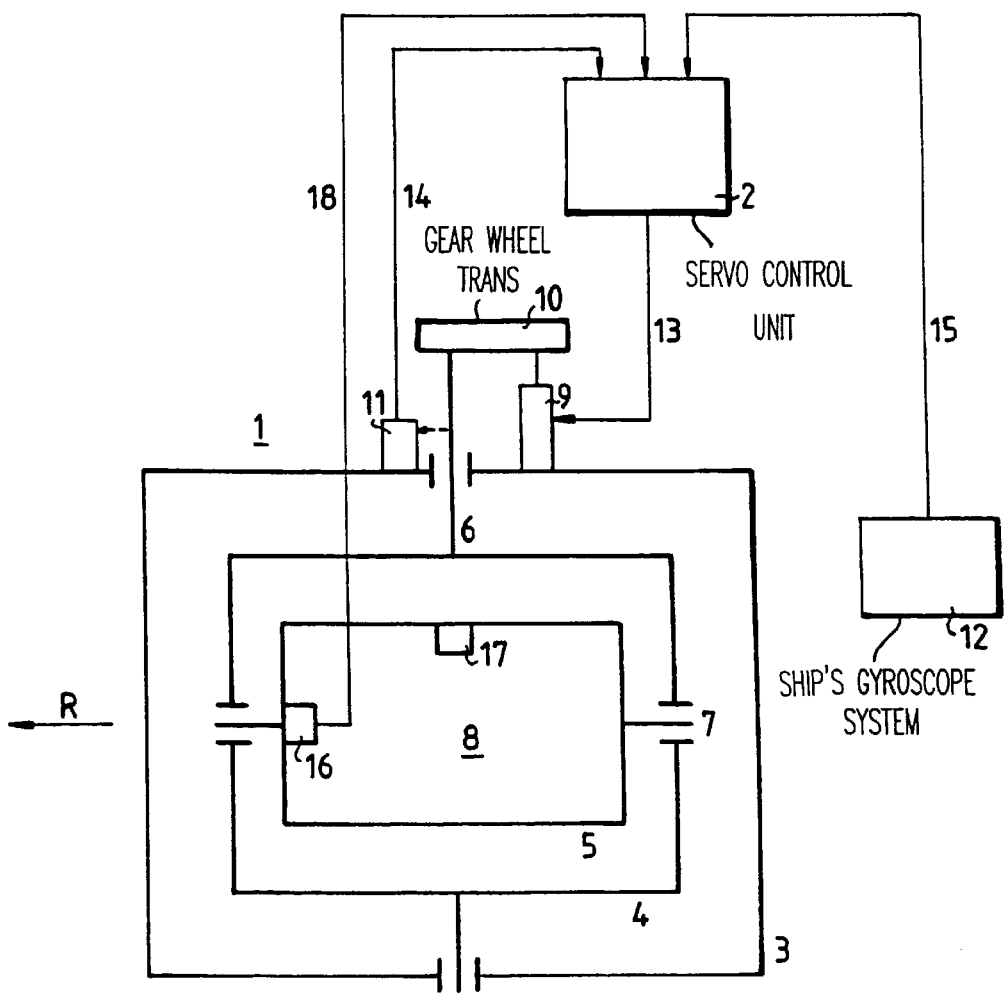
FIGS. 1A and 1B represent an embodiment of the system according to the invention, comprising a stabilization device and a servo control unit.
Figure 1B:
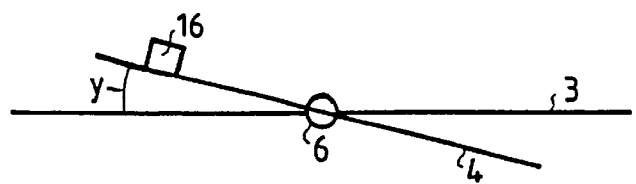

FIGS. 1A and 1B are schematic representations of an embodiment according to the invention in top view and side view respectively, comprising a stabilization device 1 and a servo control unit 2 for controlling the stabilization device 1. Stabilization device 1 comprises a yoke-shaped substructure 3, connected to a ship not shown here. The direction of navigation is indicated by arrow R. Stabilization device 1 additionally comprises a first movable yoke-shaped element 4 to which is coupled a second movable yoke-shaped element 5; both elements are rotatable about mutually non-parallel shafts 6 and 7. A stabilization platform 8 is connected to the second element 5 that comprises the side to be stabilized of the stabilization device. A search sensor, not shown, may be mounted on stabilization platform 8. The ship's pitch motions are now compensated for by rotation of element 4 about shaft 6, roll motions are compensated for by rotation of element 5 about shaft 7. To this end, both shafts 6 and 7 are provided with a servo motor and an angle sensor. For the sake of clarity, only servo motor 9, possibly provided with a gear wheel transmission 10 and angle sensor 11 are illustrated in relation to shaft 6. The servo motors are controlled by servo control unit 2 which is connected to the angular encoders and to a centrally situated system of gyroscopes 12 for encoding the ship's roll, pitch and yaw angles with respect to a north-horizontal coordinate system. In the figure, the connection with the servo motor 9 is indicated by line 13 and the connection with the angle sensor 11 with line 14. The connection with the gyro system 12 is indicated by line 15.

The system of gyroscopes 12 is, however, not capable of accounting for any deformations of the ship and the stabilization device. To this end, the stabilization platform is in accordance with the invention provided with encoders 16 and 17. These encoders respectively measure an absolute pitch and roll angle velocity of the stabilization platform with respect to an inertial coordinate system and are likewise connected to servo control unit 2. In the example of the embodiment, the angular velocity encoders 16 and 17 comprise commercially available gyrochips which are compact, inexpensive and relatively easy to apply. Conventional rate gyro systems are however also suitable. The connection of gyrochip 16 with servo control unit 2 is indicated by line 18.

FIG. 1B shows the stabilization device in side view. The first element 4 forms a small angle y with the substructure 3.

FIG. 2 shows a block diagram of a conventional system known from control technology. The stabilization device is represented as a black box P, which represents a transfer function in the Laplace domain which is realized by the stabilization device. The stabilization device is controlled by servo control unit 19. To illustrate the state of the art, only the transfer function between the control voltage applied to the servo motors, indicated by the letter u, which directly results in a control force, and the resulting angular position of the stabilization platform, indicated by the letter y, are relevant. In this context, only pitch is taken into account, as compensation for roll can be effected analogously. In operational condition, servo control unit 19 determines a servo control error, indicated by reference letter e, which is the difference between a setpoint indicated by $y_s$ and y. The servo control unit 19 also includes a regulator, indicated by reference letter C which, on the basis of the servo control error e, calculates the control current u in such a manner that the servo control error e remains minimal in spite of possible disturbances. The ship's pitch angle, indicated by $\psi_g$, measured by the system of gyroscopes 12, is also applied to servo control unit 19. This angle's negative value is taken in the block indicated by reference letter N. In order to maintain the stabilization platform in a level position, the inverse value of the ship's angles measured by the system of gyroscopes 12, i.e. the desired pitch angle of the stabilization platform, is entered as setpoint $y_s$. The above implies that in operational condition, the measured pitch angle y will follow the inverse value of the measured pitch angle of the ship as closely as possible.

As previously stated, this known method has the drawback that the gyroscopes 12 do not allow for deformations of the ship's structure, neither do the angular encoders connected to the stabilization device allow for deformations of the stabilization device itself.

Figure 3:
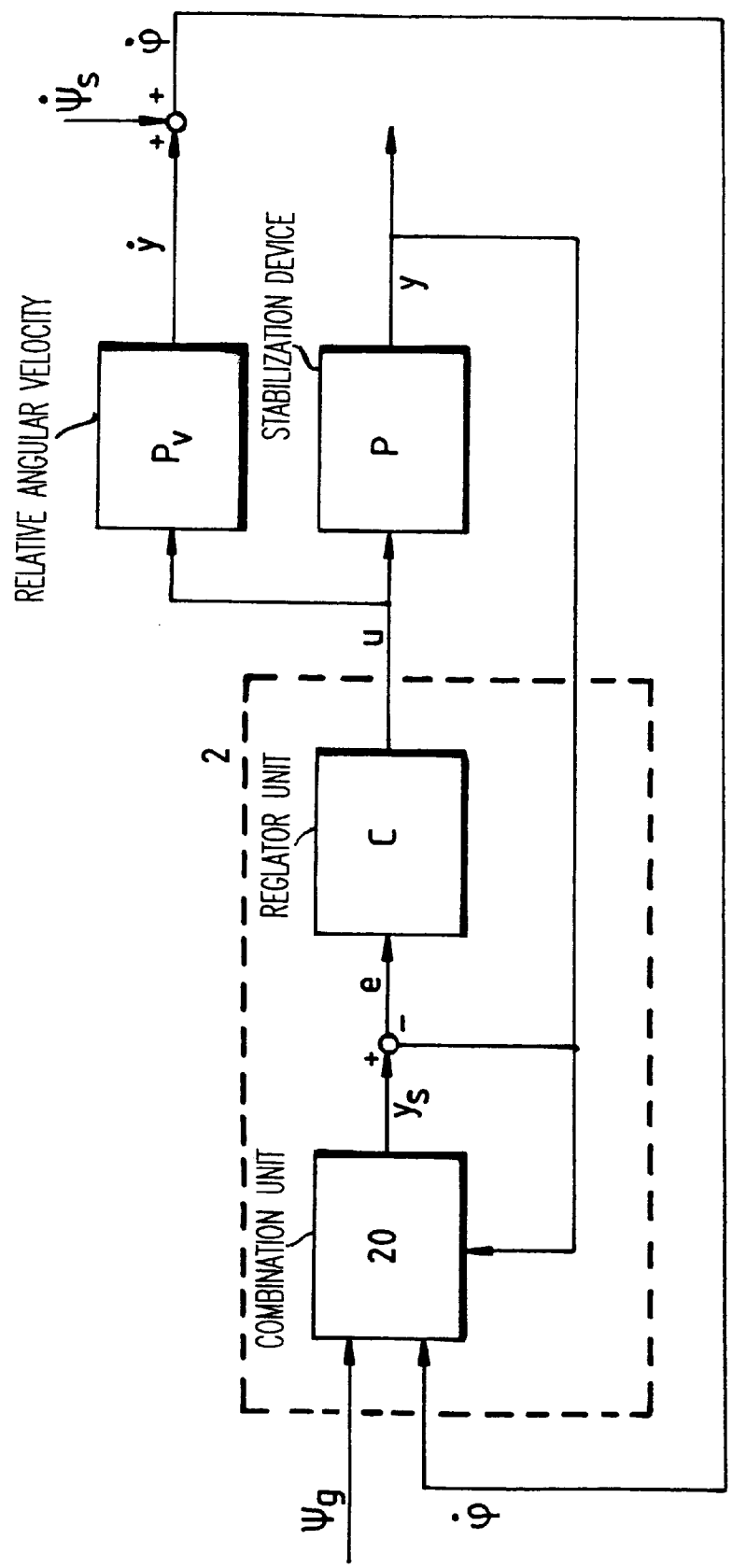
FIG. 3 represents an embodiment of a servo control unit to be employed in the system according the invention.

With reference to FIG. 3 it is shown how the servo control unit 2 according to the invention is adapted so as to obviate said drawbacks, at least as regards the roll angle. For the compensation of roll, the servo control unit can again be applied analogously. According to the invention, the measured absolute angular velocity signals indicated by φ of the stabilization platform 8 shown in FIGS. 1A and 1B are, in addition to the measuring signals $\psi_g$ and y, also applied to servo control unit 2. In a combination unit 20 incorporated in servo control unit 2, these signals are combined to generate a setpoint $y_s$. In servo control unit 2, the servo control error e is once again determined as the difference between the setpoint $y_s$ and the measured roll angle y around shaft 6 shown in FIGS. 1A and 1B. The servo control error e is applied to regulator unit C which determines a control current u for the servo motor 9.

By way of illustration, the figure also shows the measured absolute angular velocity signals φ caused by summation of the absolute angular velocity, indicated by $\psi_s$, of the substructure 3 and the relative angular velocity y of the stabilization platform 8 with respect to the substructure 3. The transfer function between the control force u of servo motor 9 and the relative angular velocity y is represented by the black box $P_y$.

Figure 4:
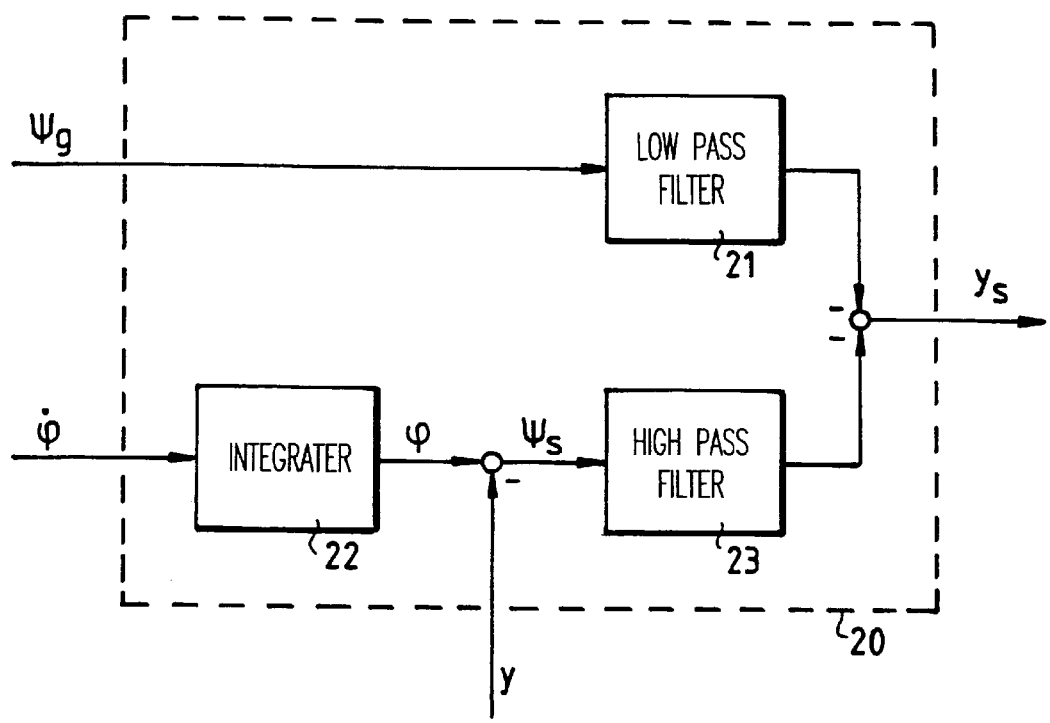
FIG. 4 represents a further elaboration on an embodiment of the servo control unit according to the invention.

FIG. 4 shows a preferred embodiment of combination unit 20. The combination unit 20 includes a low-pass filter 21 for filtering the measured absolute pitch angle of the ship to obtain filtered absolute pitch angles. If the object to be stabilized is a search sensor, the bandwidth $\omega_0$ of the filter is preferably selected to match the sensor's rotational frequency so that, in case of shortly consecutive scans, the sensor remains aligned in substantially the same direction. This is of significance, particularly if the search sensor is an electro-optical sensor provided with a pixel array. If such is the case, the pixel processing is considerably simplified, because in each scan, a pixel substantially represents the same elevation angle as in the previous scans. The combination unit furthermore includes an integrator 22 for integrating the absolute pitch angle velocity signals into absolute pitch angle position signals of the stabilization platform. From this value is subsequently subtracted the measured relative pitch angle y of the stabilization platform with respect to the substructure to yield absolute pitch angle signals $\psi_s$ of the substructure. These signals are then passed through a high-pass filter 23 which is at least substantially complementary to low-pass filter 21 so as to obtain filtered absolute pitch angle signals $\psi_s$ of substructure 3. The inverse value of these signals is then added to the inverse value of the filtered absolute pitch angles of the ship. Thus, a setpoint is generated on the basis of a frequency-dependent weighting of measurements made by the ship's gyroscopes and measurements made by the absolute angular velocity encoders. Under application of said complementary filters, this means that for high-frequency disturbances, i.e. abrupt motions, the setpoint $y_s$ is substantially determined by measurements from the absolute angular velocity encoders 16 and 17, and for low-frequency disturbances, i.e. gradual motions, by measurements from the ship's gyro system 12.

The above may be further explained with reference to formulas known from control technology. In this respect, use will be made of symbols which represent Laplace transform variables well-known in the art of control technology.

s: Laplace variable $\psi_g$: the pitch angle measured with the aid of the ship's gyroscopes φ: the pitch angle velocity of the stabilization platform measured with the aid of the gyrochip;

y: the measured angular rotation of the first element 4 about the pitch axis 6

H(s): a transfer function of the low-pass filter in the Laplace domain, dependent on the Laplace variable s, with the characteristic H(0)=1 and H(∞)=0

1−H(s): transfer function of the filter that is complementary to H(s)

$y_s$: setpoint obtained.

$y_s$ is now found to equal:

$$y_s = -\{\psi_g \cdot H(s) + \psi_s \cdot (1-H(s))\}$$

with:

$$\psi_s = \frac{\dot{\varphi}}{s} - y.$$

For H(s), a second order filter is preferably used, with the transfer function:

$$H(s) = \frac{1}{\frac{s^2}{\omega^2} + \frac{2\beta}{\omega_o}s + 1}$$

In this formula:

β: a damping factor, preferably approximating 1;

$\omega_0$: the undamped natural frequency, preferably matching the rotational frequency of a sensor to be stabilized.

On the basis of mathematical rules, it can be demonstrated that the generated setpoint, obtained as described above, yields a more accurate value of the absolute position of the substructure. Errors of a high-frequency nature caused by flexure of the ship's structure are effectively filtered out, while in the absence of error sources, the setpoint exactly represents the absolute position of the substructure for all frequencies, without any phase or amplitude errors.

It is of course understood that, under the application of principles known from control technology, a like functionality can be obtained by rearrangement of the blocks shown in the diagram. On the basis of the design techniques pertaining to Kalman filters, it is possible to derive a Kalman filter which combines the measuring signals to obtain the frequency-dependent weighting. If the noise spectra of the disturbances are known, this results in a filter that is capable of generating an even more accurate setpoint.

The above techniques according to the invention may be analogously applied to other types of stabilization platforms as for instance described in U.S. Pat. No. 5,573,218.

What is claimed:

1. A system for stabilizing an object with reference to a moving platform, comprising:

a stabilization device provided with servo motors and a servo control unit;

a stabilization platform connected to a side of said stabilization device to be stabilized;

an angular velocity measuring device for measuring angular velocities with reference to an inertial coordinate system, wherein said angular velocity measuring device is integrally connected to said stabilization platform;

an angular position measuring device utilizing gyroscopes from a central system on which the object is mounted, said gyroscope configured to encode roll, pitch, and yaw angles;

wherein said servo control unit is configured to control said servo motors based on angular position signals from said angular velocity measuring device and angular position signals from said angular position measuring device; and wherein said angular position measuring device is connected to said moving platform.

2. A system as claimed in claim 1, wherein said servo control unit is provided with a calculation mechanism configured to combine the angular velocity signals and said angular position signals into additional control signals for said stabilization device.

3. A system as claimed in claim 2, wherein said calculation mechanism, used for calculating said additional control signals, is configured to perform a frequency-dependent weighting of said angular velocity signals and said angular position signals.

4. A system as claimed in claim 3, wherein the calculation mechanism is configured to perform the frequency-dependent weighting such that the control signals for frequencies below a predetermined frequency are substantially determined by said angular position signals and the control signals for higher frequencies are substantially determined by the angular velocity signals.

5. A system as claimed in claim 4, wherein said calculation mechanism comprises two complementary filters, connected to said angular position signals and to said angular velocity signals, and a summation device configured to obtain said control signals at least in operational condition.

6. A system as claimed in claim 4, wherein said calculation mechanism include a Kalman filter, the output of which, at least in an operational condition, is configured to produce said control signals.

7. A system for stabilizing an object with reference to a moving platform, comprising:

a stabilization device provided with servo motors and a servo control unit;

a stabilization platform connected to a side of said stabilization device to be stabilized;

an angular velocity measuring device for measuring angular velocities with reference to an inertial coordinate system, wherein said angular velocity measuring device is integrally connected to said stabilization platform;

an angular position measuring device;

wherein said servo control unit is configured to control said servo motors based on angular position signals from said angular velocity measuring device and angular position signals from said angular position measuring device;

wherein said angular position measuring device is connected to said moving platform;

wherein said servo control unit is provided with a calculation mechanism configured to combine the angular velocity signals and said angular position signals into additional control signals for said stabilization device; and wherein said calculation mechanism, used for calculating said additional control signals, is configured to perform a frequency-dependent weighting of said angular velocity signals and said angular position signals.

8. A system A system for stabilizing an object with reference to a moving platform, comprising:

a stabilization device provided with servo motors and a servo control unit;

a stabilization platform connected to a side of said stabilization device to be stabilized;

an angular velocity measuring device for measuring angular velocities with reference to an inertial coordinate system, wherein said angular velocity measuring device is integrally connected to said stabilization platform;

an angular position measuring device;

wherein said servo control unit is configured to control said servo motors based on angular position signals from said angular velocity measuring device and angular position signals from said angular position measuring device;

wherein said angular position measuring device is connected to said moving platform;

wherein said servo control unit is provided with a calculation mechanism configured to combine the angular velocity signals and said angular position signals into additional control signals for said stabilization device;

wherein said calculation mechanism, used for calculating said additional control signals, is configured to perform a frequency-dependent weighting of said angular velocity signals and said angular position signals; and wherein the calculation mechanism is configured to perform the frequency-dependent weighting such that the control signals for frequencies below a predetermined frequency are substantially determined by said angular position signals and the control signals for higher frequencies are substantially determined by the angular velocity signals.

9. A system as claimed in claim 8, wherein said calculation mechanism comprises two complementary filters, connected to said angular position signals and to said angular velocity signals, and a summation device configured to obtain said control signals at least in operational condition.

10. A system as claimed in claim 8, wherein said calculation mechanism include a Kalman filter, the output of which, at least in an operational condition, is configured to produce said control signals.

* * * * *